US006593258B1

(12) United States Patent
Shimatani et al.

(10) Patent No.: US 6,593,258 B1
(45) Date of Patent: *Jul. 15, 2003

(54) $LI_2O$-$AL_2O_3$-$SIO_2$ TRANSPARENT CRYSTALLIZED GLASS AND CRYSTALLIZABLE

(75) Inventors: Narutoshi Shimatani, Uji (JP); Akihiko Sakamoto, Shiga (JP)

(73) Assignee: Nippon Electric Glass Co., Ltd., Otsu (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/744,120

(22) PCT Filed: Jun. 21, 1999

(86) PCT No.: PCT/JP99/03293

§ 371 (c)(1),
(2), (4) Date: Jan. 19, 2001

(87) PCT Pub. No.: WO00/73225

PCT Pub. Date: Dec. 7, 2000

(30) Foreign Application Priority Data

May 28, 1999 (JP) ............................................. 11-149426

(51) Int. Cl.[7] ............................................. C03C 10/14
(52) U.S. Cl. ............................................. 501/4; 501/7
(58) Field of Search ......................................... 501/4, 7

(56) References Cited

U.S. PATENT DOCUMENTS

| 4,455,160 A | * | 6/1984 | Rittler | 65/30.13 |
| 4,707,458 A | * | 11/1987 | Chyung et al. | 501/4 |
| 5,017,519 A | * | 5/1991 | Morimoto et al. | 501/7 |
| 5,070,045 A | * | 12/1991 | Comte et al. | 501/4 |
| 5,336,643 A | * | 8/1994 | Goto et al. | 501/4 |
| 5,591,682 A | * | 1/1997 | Goto et al. | 501/4 |
| 5,972,816 A | * | 10/1999 | Goto | 501/4 |
| 6,358,869 B1 | * | 2/2002 | Yamada et al. | 501/4 |
| 6,387,509 B1 | * | 5/2002 | Goto et al. | 501/4 |
| 6,413,906 B1 | * | 7/2002 | Shimatani et al. | 501/4 |

FOREIGN PATENT DOCUMENTS

| JP | 59-116150 | 7/1984 |
| JP | 64-52631 | 2/1989 |
| JP | 8-104539 | 4/1996 |
| JP | 9-169542 | 6/1997 |
| JP | 9-188538 | 7/1997 |

OTHER PUBLICATIONS

8–104539, translation, Apr. 1996.*
9–188538, translation, Jul. 1997.*

* cited by examiner

*Primary Examiner*—Karl Group
(74) *Attorney, Agent, or Firm*—Collard & Roe, P.C.

(57) ABSTRACT

In an $Li_2O$—$Al_2O_3$—$SiO_2$ transparent crystallized glass, β-quartz solid solution is produced as main crystals, an average coefficient of linear thermal expansion within a range between 30 and 380° C. is $-10 \sim 10 \times 10^{-7}/°C.$, and β-OH in an amount of 0.28/mm or more is contained. Preferably, the content of each component of $Li_2O$, $SiO_2$, and $Al_2O_3$ satisfies, by weight ratio, the relationship given by $0.058 \geq \{Li_2O/(SiO_2+Al_2O_3)\} \geq 0.031$.

3 Claims, No Drawings

$Li_2O$-$Al_2O_3$-$SiO_2$ TRANSPARENT CRYSTALLIZED GLASS AND CRYSTALLIZABLE

CROSS REFERENCE TO RELATED APPLICATIONS

Applicants claim priority under 35 U.S.C. §119 of Japanese Application No. 149426/1999, filed on May 28, 1999. Applicants also claim priority under 35 U.S.C. §120 of PCT/JP99/03293 filed on Jun. 21, 1999. The international application under PCT article 21(2) was not published in English.

TECHNICAL FIELD

This invention relates to a transparent crystallized glass for use in a front window or an inspection window of a combustion apparatus for burning oil, coal, gas, wood, or the like, i.e., a space heater, a heating furnace, an annealing furnace, and so on.

BACKGROUND ART

The function of a front window in a space heater or the like is to enhance a space-heating effect by transmitting heat radiation emitted from a flame inside the heater to the outside as well as to increase visual warmth by allowing the flame to be visible. On the other hand, the function of an inspection window is to allow the burning condition of the flame to be observed from the outside. These windows must be resistant against a high temperature produced from the flame and heat shock at the ignition. Therefore, a window glass material used in the windows of such combustion apparatus is required to be transparent as well as to be low in thermal expansion and high in mechanical strength so that the heat resistance and the heat-shock resistance are excellent.

At present, as the material for the windows of the space heater, use is made of a borosilicate glass, a silica glass, and an $Li_2O$—$Al_2O_3$—$SiO_2$ transparent crystallized glass. However, the borosilicate glass is not sufficient in heat resistance and heat-shock resistance while the silica glass is excellent in thermal characteristics but is expensive. On the other hand, the $Li_2O$—$Al_2O_3$—$SiO_2$ transparent crystallized glass has a small coefficient of thermal expansion and a high mechanical strength so that the heat resistance and the heat-shock resistance are excellent, and it can be produced at a relatively low cost. Therefore, this glass is widely used.

However, the $Li_2O$—$Al_2O_3$—$SiO_2$ transparent crystallized glass has a problem that, when it is placed in a combustion atmosphere, the inner surface, that is, the burning-side surface of the window is subjected to chemical corrosion to produce microcracks which result in a considerable decrease in transparency and mechanical strength.

The reason why the above-mentioned problem occurs is as follows. In the combustion atmosphere of the combustion apparatus for burning oil, coal, gas, wood, or the like, $SO_x$ produced from sulfur contained in such fuel is present and reacts with $H_2O$ produced by combustion to produce $H_2SO_4$. Hydrogen ions produced from $H_2SO_4$ cause an ion exchange reaction with lithium ions in crystals of the $Li_2O$—$Al_2O_3$—$SiO_2$ transparent crystallized glass to cause shrinkage in volume of the crystals, resulting in occurrence of cracks.

In order to prevent the above-mentioned problem, use is made of a technique of forming a coating film such as $SiO_2$ on the surface of the $Li_2O$—$Al_2O_3$—$SiO_2$ transparent crystallized glass. However, this technique is not preferable because the production cost becomes high. Alternatively, it is possible to suppress the occurrence of the ion exchange reaction with the hydrogen ions by reducing the content of the lithium ions in the $Li_2O$—$Al_2O_3$—$SiO_2$ transparent crystallized glass. However, there arises a problem that the transparency is deteriorated and the coefficient of thermal expansion is increased.

It is therefore an object of the present invention to provide an $Li_2O$—$Al_2O_3$—$SiO_2$ transparent crystallized glass which will not produce microcracks even if it is exposed to an atmosphere containing $H_2SO_4$ produced by a fuel such as oil, coal, gas, wood, or the like for a long time, as well as a crystallizable glass for obtaining such crystallized glass.

DISCLOSURE OF THE INVENTION

As a result of various experiments, the present inventors have found out that β-OH contained in an $Li_2O$—$Al_2O_3$—$SiO_2$ transparent crystallized glass plays an important role in suppressing the occurrence of microcracks due to an ion exchange reaction with hydrogen ions, and thus have achieved the present invention.

Specifically, an $Li_2O$—$Al_2O_3$—$SiO_2$ transparent crystallized glass according to the present invention is characterized in that β-quartz solid solution is produced as main crystals, an average coefficient of linear thermal expansion within a range between 30 and 380° C. is $-10 \sim 10 \times 10^{-7}$/°C., and β-OH in an amount of 0.28/mm or more is contained.

Further, an $Li_2O$—$Al_2O_3$—$SiO_2$ crystallizable glass according to the present invention is characterized by having a property of being transformed into a crystallized glass in which β-quartz solid solution is produced as main crystals, an average coefficient of linear thermal expansion within a range between 30 and 380° C., is $-10 \sim 10 \times 10^{-7}$/°C., and β-OH in an amount of 0.28/mm or more is contained.

In the present invention, the amount of β-OH is obtained by the following formula (1) by the use of an infrared absorption spectrum of the crystallized glass.

$$\text{Amount of β-OH} = \{\log(T_{3850}/T_{3500})\}/t \quad (1)$$

wherein $T_{3850}$: transmittance around 3850 $cm^{-1}$ $T_{3500}$: minimum transmittance in an absorption band around 3500 $cm^{-1}$ t: thickness (mm) of crystallized glass at measurement of spectrum.

BEST MODE FOR EMBODYING THE INVENTION

In the present invention, an $Li_2O$—$Al_2O_3$—$SiO_2$ transparent crystallized glass contains in the glass β-OH in an amount of 0.28/mm or more, preferably within a range between 0.40 and 2.0/mm. β-OH contributes to a decrease in concentration of crystal-forming components on the glass surface upon crystallization of glass and an increase in concentration of the other elements. Consequently, an exchange reaction between lithium ions in the crystals and hydrogen ions on the surface of the crystallized glass is suppressed to thereby prevent the occurrence of microcracks. In case where 0.28/mm or more of β-OH is contained in the glass, it is possible to remarkably suppress the occurrence of the microcracks even if $H_2SO_4$ is contained in a combustion atmosphere. On the other hand, if the content of the β-OH is less than 0.28/mm, the effect of suppressing the microcracks is insufficient. The amount of β-OH in the glass can be increased by increasing the content of moisture in a combustion gas upon melting of the glass, by performing vapor bubbling in the molten glass, or by selecting a material high in moisture content (OH).

According to the present invention, β-quartz solid solution is produced in the glass as main crystals so that the average coefficient of thermal expansion is adjusted within a range of $-10 \sim 10 \times 10^{-7}/°C$. However, in case where the average coefficient of thermal expansion is out of the above-mentioned range, it is impossible to ensure the heat resistance and the heat-shock resistance sufficient for a window of a combustion apparatus.

Preferably, the $Li_2O$—$Al_2O_3$—$SiO_2$ transparent crystallized glass and a crystallizable glass as a raw glass thereof according to the present invention contain, by weight ratio, each component of $Li_2O$, $SiO_2$, and $Al_2O_3$ so that the relationship given by $0.058 \geq \{Li_2O/(SiO_2+Al_2O_3)\} \geq 0.031$ is satisfied.

The reason is as follows. If the value of the above-mentioned formula is greater than 0.058, the amount of produced crystals increases so that the decrease in concentration of the crystal components on the surface which is caused by β-OH is difficult to occur. As a result, it is impossible to prevent the exchange reaction between the lithium ions and the hydrogen ions. On the other hand, in case where the value of the above-mentioned formula is smaller than 0.031, the coefficient of thermal expansion tends to increase and a transparent appearance is difficult to obtain.

Furthermore, the crystallized glass and the crystallizable glass of the present invention may contain various components other than $Li_2O$, $SiO_2$, and $Al_2O_3$. For example, $Na_2O$, $K_2O$, MgO, ZnO, BaO, or the like may be contained as a component for promoting melting and controlling the coefficient of thermal expansion, $TiO_2$, $ZrO_2$, or the like as a nucleating agent, $P_2O_5$ as a component for promoting nucleation, and $As_2O_3$, $Sb_2O_3$, $SnO_2$, Cl, $So_3$, or the like as a fining agent. Among these components, it is preferable that the contents of ZnO and BaO are equal to 1 weight % or less and 1.5 weight % or less, respectively.

ZnO can be added up to about 3% for the purpose of compensating for a part of $Li_2O$. However, this is a component to form a solid solution with the β-quartz solid solution as main crystals. Therefore, if the content exceeds 1%, the amount of produced crystals is increased so that an ion exchange reaction tends to occur. This results in difficulty in working of the effect of suppressing microcracks due to β-OH.

On the other hand, BaO can be added up to about 5% as a component for promoting the melting of glass. However, if more than 1.5% is added, the glass tends to be colored dark brown. Thus, it is difficult to obtain an appearance preferable for the window of the combustion apparatus.

In the present invention, the $Li_2O$—$Al_2O_3$—$SiO_2$ transparent crystallized glass and the crystallizable glass as a raw glass thereof preferably have a composition of, by weight percent, 55–75% (preferably, 60–75%) $SiO_2$, 15–30% (preferably, 17–27%) $Al_2O_3$, 2–5% (preferably, 2–4.8%) $Li_2O$, 0–3% (preferably, 0–1%) $Na_2O$, 0–3% (preferably, 0–1%) $K_2O$, 0–5% (preferably, 0–4%) MgO, 0–3% (preferably, 0–1%) ZnO, 0–5% (preferably, 0–1.5%) BaO, 0–5% (preferably, 1–5%) $TiO_2$, 0–4% (preferably, 0.5–4%) $ZrO_2$, 0–5% (preferably, 0–4%) $P_2O_5$, 0–2.5% (preferably, 0–2%) $As_2O_3$, 0–2.5% (preferably, 0–2%) $Sb_2O_3$, and 0–2.5% (preferably, 0–2%) $SnO_2$.

Hereinbelow, description will be made about specific examples of the $Li_2O$—$Al_2O_3$—$SiO_2$ transparent crystallized glass according to the present invention. The following Table 1 shows each of Examples of the present invention (Samples Nos. 1–6) and a Comparative Example (Sample No. 7).

TABLE 1

|  | Example | | | | | | Comparative Example |
| --- | --- | --- | --- | --- | --- | --- | --- |
|  | 1 | 2 | 3 | 4 | 5 | 6 | 7 |
| Glass Composition weight % | | | | | | | |
| $SiO_2$ | 69.6 | 67.5 | 65.5 | 61.5 | 63.5 | 64.5 | 65.5 |
| $Al_2O_3$ | 17.8 | 18.8 | 22.1 | 21.7 | 21.0 | 20.5 | 22.1 |
| $Li_2O$ | 2.5 | 3.5 | 4.2 | 4.7 | 3.6 | 3.0 | 4.2 |
| $Na_2O$ | 0.4 | 0.4 | 0.5 | 0.8 | 0.8 | 0.5 | 0.5 |
| $K_2O$ | — | — | 0.3 | 0.6 | 0.4 | 0.3 | 0.3 |
| MgO | 2.7 | 2.2 | 0.5 | 1.0 | 0.3 | 2.1 | 0.5 |
| ZnO | 0.9 | 1.5 | — | 0.8 | 1.4 | 0.8 | — |
| BaO | — | 1.0 | — | 1.2 | 2.5 | 1.0 | — |
| $TiO_2$ | 4.8 | 3.5 | 1.9 | 2.2 | 2.8 | 1.9 | 1.9 |
| $ZrO_2$ | 0.3 | 0.6 | 2.3 | 2.2 | 2.0 | 2.5 | 2.3 |
| $P_2O_5$ | — | — | 1.4 | 1.5 | — | 1.5 | 1.4 |
| $As_2O_3$ | 1.0 | — | 1.3 | — | — | 1.4 | 1.3 |
| $Sb_2O_3$ | — | 1.0 | — | — | 1.7 | — | — |
| $SnO_2$ | — | — | — | 1.8 | — | — | — |
| β-OH (/mm) | 0.42 | 0.42 | 0.57 | 0.78 | 0.53 | 0.60 | 0.27 |
| $Li_2O/(SiO_2 + Al_2O_3)$ | 0.029 | 0.041 | 0.048 | 0.056 | 0.043 | 0.035 | 0.048 |
| Main crystals | β-Q. | β-Q. | β-Q. | β-Q. | β-Q. | β-Q. | β-Q. |
| Coefficient of thermal expansion ($\times 10^{-7}/°$ C.) | 3 | −3 | −5 | −6 | −5 | 2 | −5 |
| Acceleration test | absent | absent | absent | absent | absent | absent | present |
| Mount test (days) | >50 | 40 | >50 | >50 | 35 | >50 | 7 |

Each sample in the above Table 1 was prepared as follows. First, an $Li_2O$—$Al_2O_3$—$SiO_2$ crystallizable glass was melted and formed to have the composition and the β-OH content specified in the above Table 1. Next, the glass was held in an electric furnace at 780° C. for one hour and then at 850° C. for one hour to cause crystallization. Consequently, each sample was obtained. The amount of β-OH in the glass is increased or decreased by adjusting the concentration of oxygen supplied to a fuel such as oil and gas during combustion of the fuel as a heat source for melting and by increasing or decreasing the amount of moisture contained in the combustion gas. The melting of the glass was carried out in a refractory material but may be performed in platinum.

The content of β-OH is obtained by an infrared spectrophotometer using each sample polished into a thickness of about 3 mm. The identification of the produced crystals and the measurement of the coefficient of thermal expansion were carried out by X-ray diffraction and by a dilatometer, respectively. It is noted that "β-Q." in the Table represents the β-quartz solid solution.

As shown in the above Table 1, each sample contained the β-quartz solid solution as the main crystals and had the average coefficient of linear thermal expansion within a range of $-10 \sim 10 \times 10^{-7}/°C$. The β-OH amount in each of the Samples Nos. 1–6 was 0.42–0.78/mm while the β-OH amount in the Sample No. 7 was 0.27/mm. The appearance of each sample was transparent, but Sample No. 1 was slightly opalescent and Sample No. 5 was slightly colored dark brown.

Then, each sample was evaluated for microcrack resistance. The microcrack resistance was evaluated by two kinds of methods including an acceleration test and a mount test in a combustion apparatus.

The acceleration test was carried out in the following manner. At first, 20 milliliters of sulfuric acid water solution having a concentration of 6 vol % was poured into a beaker having a volume of 1 liter. Then, a net was arranged in the beaker, and a sample was placed on the net to be exposed to vapor of sulfuric acid. Thereafter, the beaker was untightly closed by a glass plate. Next, after heating at 320° C. for 30 minutes, the sample was taken out and the surface thereof was observed by a microscope. In the Table 1, the indications of "absent" and "present" were made if cracks were not observed and observed, respectively.

In the mount test, each sample of the crystallized glass was attached to the front surface of a stove using, as a fuel, light oil containing sulfur. Burning was continuously carried out in an ordinary condition. The evaluation was performed in terms of the number of days that have lapsed until microcracks were visually observed.

As a result, none of Samples Nos. 1–6 of the present invention experienced cracks produced in the acceleration test. In the mount test, the occurrence of microcracks was not observed for more than 35 days. Thus, the microcrack resistance was good. Especially, in each of Samples Nos. 1, 3, 4, and 6 having the ZnO content of 1% or less, occurrence of microcracks was not observed after lapse of 50 days in the mount test. Thus, these Samples had a very excellent microcrack resistance.

On the other hand, the Sample No. 7 as the Comparative Example is a crystallized glass having an oxide composition same as the Sample No. 3 but is small in β-OH content. Therefore, it was revealed that this Sample was far inferior in both of the acceleration test and the mount test than each sample of the Examples and poor in microcrack resistance.

These facts show that the crystallized glass according to the present invention is excellent in microcrack resistance.

As described above, the $Li_2O$—$Al_2O_3$—$SiO_2$ transparent crystallized glass of the present invention is not subjected to occurrence of microcracks even if it is exposed for a long period of time to an atmosphere containing $H_2SO_4$ produced by the fuel such as oil, coal, gas, and wood. Therefore, this glass is very effective as a window glass material for a front window or an inspection window of a combustion apparatus such as a space heater, a heating furnace, and an annealing furnace.

Further, by the use of the $Li_2O$—$Al_2O_3$—$SiO_2$ crystallizable glass according to the present invention, it is possible to produce a transparent crystallized glass suitable for a material of a front window or an inspection window of a combustion apparatus such as a space heater, a heating furnace, and an annealing furnace.

INDUSTRIAL APPLICABILITY

The transparent crystallized glass according to the present invention is most suitable for use as a front window or an inspection window of a combustion apparatus for burning oil, coal, gas, wood, or the like, i.e., a space heater, a heating furnace, or an annealing furnace, and so on.

What is claimed is:

1. An $Li_2O$—$Al_2O_3$—$SiO_2$ transparent crystallized glass, wherein β-quartz solid solution is produced as main crystals, an average coefficient of linear thermal expansion within a range between 30 and 380° C. is $-10 \sim 10 \times 10^{-7}/°C.$, and β-OH in an amount of 0.28/mm or more is contained.

2. An $Li_2O$—$Al_2O_3$—$SiO_2$ transparent crystallized glass as claimed in claim 1, wherein the content of each component of $Li_2O$, $SiO_2$, and $Al_2O_3$ satisfies, by weight ratio, the relationship given by $0.058 \geq \{Li_2O/(SiO_2+Al_2O_3)\} \geq 0.031$.

3. An $Li_2O$—$Al_2O_3$—$SiO_2$ transparent crystallized glass as claimed in claim 1 or 2, wherein said $Li_2O$—$Al_2O_3$—$SiO_2$ transparent crystallized glass is used for a window of a combustion apparatus.

* * * * *